Jan. 3, 1950 T. J. MORGAN ET AL 2,493,463
LENS FOCUSING AND ADJUSTING DEVICE
Filed Sept. 14, 1946 2 Sheets-Sheet 2

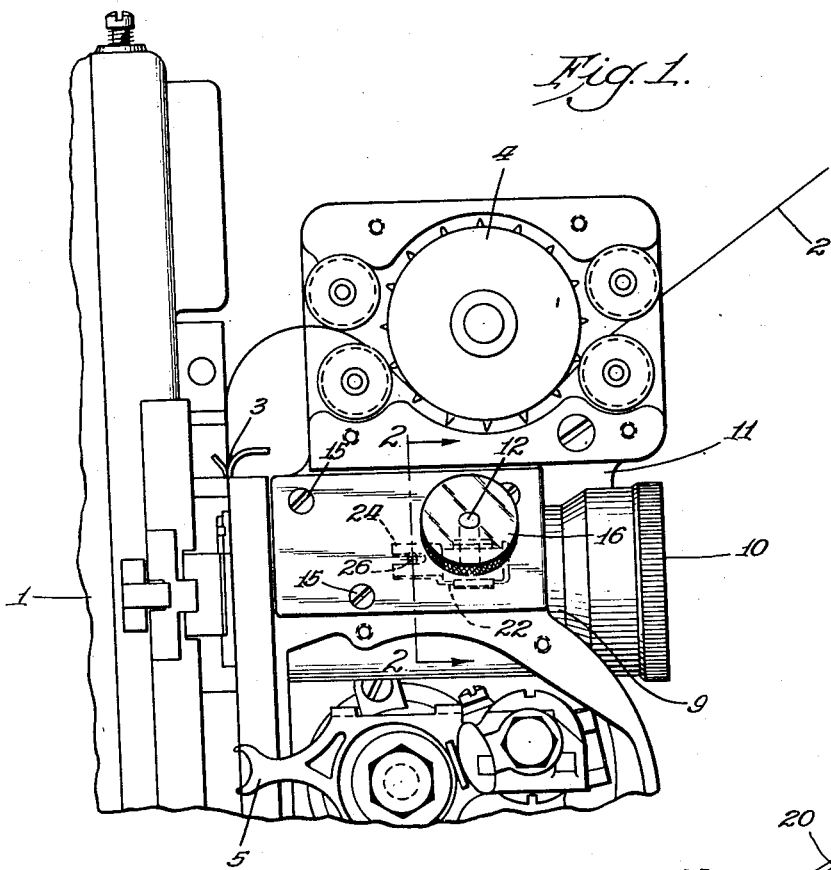

INVENTORS.
Thomas J. Morgan and
George P. Hazzard
BY
Soans Pond, & Anderson,
ATTYS.

Patented Jan. 3, 1950

2,493,463

UNITED STATES PATENT OFFICE 2,493,463

LENS FOCUSING AND ADJUSTING DEVICE

Thomas J. Morgan and George P. Hazzard, Chicago, Ill., assignors to Ampro Corporation, Chicago, Ill., a corporation of Illinois Application September 14, 1946, Serial No. 697,024

5 Claims. (Cl. 88—24)

1

In motion picture projectors heretofore in common use, rough adjustment of the lens was accomplished by an axial movement and fine adjustment by a rotary movement of the lens relative to its mounting. In the production of projectors, inaccuracies in the construction of the lens barrel and mounting sometimes occur which cause an objectionable wobbling of the lens when it is rotated to effect the fine adjustment. When the lens is rotated to accomplish the fine adjustment, it must turn in a true circle, otherwise, the wobbling of the lens will cause an objectionable vertical and lateral shifting of the projected image on the screen.

The main objects of this invention are to provide an improved lens focusing device in which both the rough and fine adjustments may be accomplished by an axial movement of the lens so as to avoid the objectionable shifting of the projected image caused by wobbling of the lens during rotation; to provide a lens mounting having an improved focusing sleeve which will permit a lens supported therein to be easily and quickly shifted for accomplishing the necessary rough and fine adjustments to focus the lens; to provide improved manually operable means for axially shifting the focusing sleeve; and to provide an improved lens mounting which may be easily and quickly assembled and which is particularly adapted for use in cinematographs.

An illustrative embodiment of this invention is shown in the accompanying drawings, wherein:

Figure 1 is a fragmentary side elevation of a cinematograph having an improved lens mounting.

Figure 2 is an enlarged vertical transverse section of the lens mounting, the view being taken on the line 2—2 of Figure 1.

Figure 7 is a perspective view of the shuttle which coacts with the cam of the adjusting means.

Figure 3:
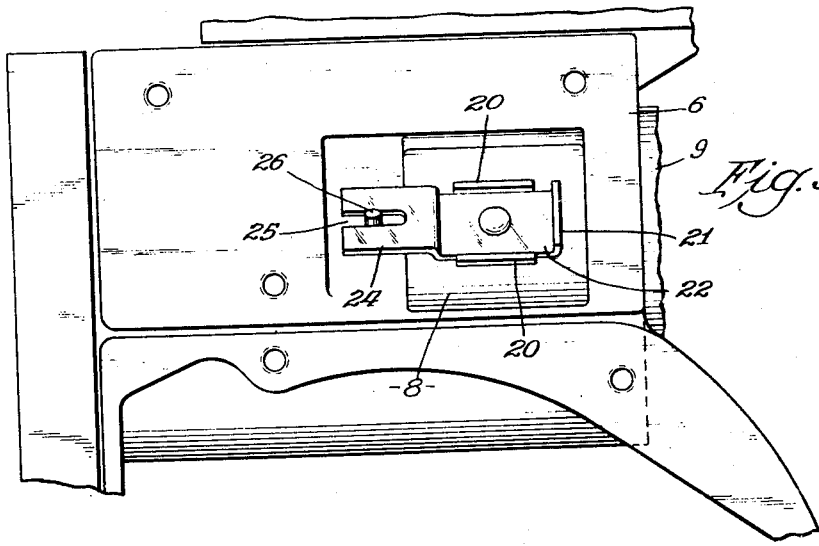
Figure 3 is an enlarged side elevation of the lens mounting with the adjusting means removed, the view being taken on the line 3—3 of Figure 2.
Figure 4:
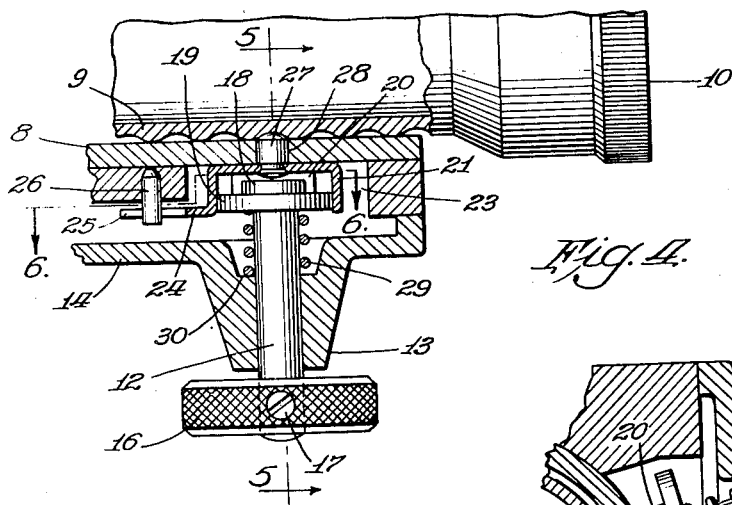
Figure 4 is a section taken on the line 4—4 of Figure 2.

Inasmuch as this invention relates particularly to the lens mounting, the accompanying drawings show only those portions of the projector which are located adjacent the lens mounting and a description of which will be of assistance in understanding the invention.

Cinematographs generally include an upright casing having a rear compartment for housing

2 the usual light bulb, reflector, and condenser. In the front wall of the casing is a vertical guideway through which the film is fed intermittently by a suitable claw and sprockets for momentarily positioning each picture directly in front of the light aperture. Positioned between the source of light and the light aperture are the light interceptor and safety shutter which may be of the construction shown in the application of Arthur S. Dearborn, Serial Number 690,699, filed August 15, 1946.

In the construction shown, the improved lens mounting is applied to a cinematograph comprising a casing 1 on which is mounted the usual feed and take-up reels (not shown) for supporting a film 2 which is fed downwardly through a vertical guideway 3 by mechanism which includes a sprocket 4 and claw 5.

The improved lens mounting includes a bearing block 6 having a bore 7 in which is slidably mounted an axially shiftable focusing tube or shell 8 which supports a lens ferrule having a substantially circumferentially ribbed exterior, such as the usual externally threaded barrel or ferrule 9 of a lens 10.

The bearing block 6 is an integral part of a forwardly extending side wall 11 of the casing 1.

The outer smooth surface of the focusing tube 8 fits snugly within the bore 7 so as to prevent any wobbling of the tube when it is shifted axially to adjust the position of the lens for bringing the image into focus.

The inner surface of the tube 8 is smooth so as to permit a quick rough adjustment of the lens by a straight-line or rotary movement of the lens relative to the tube.

The improved means for manually shifting the focusing tube includes a stem 12 which is rotatably supported in a boss 13 on a cover plate 14 which is secured to the block 6 by screws 15. A knob 16 is secured to the outer end of the stem 12 by a screw 17.

Formed on the inner end of the stem 12 are a concentric guide washer 18 and an eccentric cam 19 coacting respectively with a pair of side flanges 20 and a pair of end flanges 21 formed on a shuttle 22 which is slidably supported in a recess 23 formed in the bearing block 6. This shuttle serves as an operating connection between the stem 12 and the focusing tube 8. One of the flanges 21 has a lateral extension 24 provided with a slot 25 to receive a guide pin 26 which is mounted on the bearing block. The washer 18 engaging the flanges 20, and the pin 26 engaging the slot 25 guide the shuttle 22 in its straight line movement which in turn is imparted to the focusing tube 8.

Rigidly secured to the base of the shuttle is a stud 27 which extends through an aperture 28 in the focusing tube whereby any movement of the shuttle will be transmitted to the focusing tube and the lens which it supports. The extremity of the stud is rounded and extends into engagement with the externally threaded ferrule 9 to adjustably secure the lens within the focusing tube.

Figure 5:
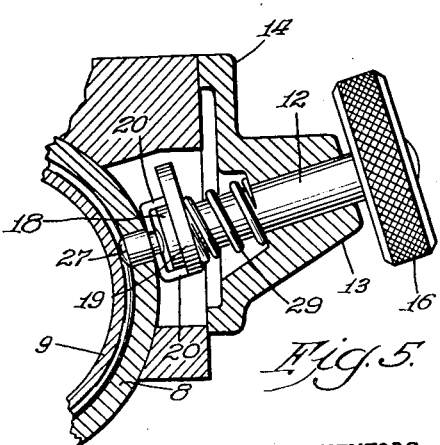
Figure 5 is a transverse vertical section taken on the line 5—5 of Figure 4, the adjusting means being shown in elevation.
Figure 6:
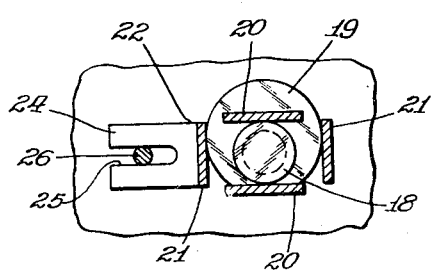
Figure 6 is a section taken on the line 6—6 of Figure 4.

The shuttle and its connected stud 27 are yieldably retained in operative position by a helical spring 29 which embraces the stem 12. One end of the spring engages the cam 19 and its other end abuts a shoulder 30 in the boss 13. The inner face of the cam 19 engages the edges of the flanges 20, as shown in Fig. 5, so as to urge the shuttle and its stud 27 inwardly toward the focusing tube. The stud 27 permits the lens 10 to be rotated in the focusing tube and, by reason of its retractability, it permits the lens to be shifted axially in a straight-line movement relative to the focusing tube.

This improved construction greatly facilitates the initial assembly of the projector. To assemble the structure, the focusing tube 8 is inserted in the bearing block 6 and the shuttle 22 is then placed in the recess 23 with the stud 27 extending through the aperture 28. The spring 29 is applied to the stem 12 and the stem is then inserted in the boss 13, after which the knob 16 is secured to the outer end of the stem. The cover plate 14 is then applied to the bearing block so as to position the cam 19 in operative position between the flanges 21.

The lens 10 is inserted into the focusing tube and roughly adjusted by a straight-line movement which causes the shuttle 22, and stem 12 to be retracted against the action of the spring 29 whenever a thread of the ferrule 9 strikes the stud 27.

To obtain a fine adjustment of the lens for focusing the image on the screen, the knob 16 is turned so as to rotate the cam 19 for moving the shuttle 22 which imparts an axial movement to the focusing tube and the lens.

Although but one specific embodiment of this invention has been herein shown and described, it will be understood that details of the construction shown may be altered without departing from the spirit of the invention as defined by the following claims:

We claim:

1. In a device of the class described, the combination with a lens having an externally threaded ferrule, of a mounting comprising a support, an axially movable focusing tube slidably mounted on said support for receiving the lens ferrule, a shuttle plate having a stud extending through an aperture in the wall of said tube for engagement with the threads of the lens ferrule, a cover detachably secured to said support, a stem rotatably mounted on said cover, and a cam on said stem operatively engaging said shuttle plate for shifting said focusing tube axially upon the rotation of said stem.

2. In a device of the class described, the combination with a lens having an externally threaded ferrule, of a mounting comprising a support, an axially movable focusing tube slidably mounted on said support for receiving the lens ferrule, a shuttle plate having a stud extending through an aperture in the wall of said tube for engagement with the threads of the lens ferrule, a cover detachably secured to said support, a stem rotatably mounted on said cover, a knob on one end of said stem, a cam on the other end of said stem positioned in operative engagement with said shuttle plate for shifting said tube axially upon the rotation of said stem, and a spring embracing said stem for normally urging said stud into operative engagement with the lens ferrule, said spring permitting retraction of said stud when the lens is shifted axially relative to said tube.

3. In a device of the class described, the combination with a lens having an externally threaded ferrule, of a mounting comprising a support, an axially movable focusing tube slidably mounted on said support for receiving the lens ferrule, a plate having a stud extending through an aperture in the wall of said tube for engagement with the threads of the lens ferrule, a cover detachably secured to said support, a stem rotatably mounted on said cover, a knob on one end of said stem, a cam on the other end of said stem positioned in operative engagement with said plate for shifting said tube axially upon the rotation of said stem, and a helical spring embracing said stem between said cam and said cover for normally holding said plate and stud in operative engagement with said tube.

4. In a device of the class described, the combination with a lens having an externally, substantially circumferentially ribbed ferrule, of a mounting having a bore, a focusing tube slidable in said bore surrounding the ferrule and supporting the latter for relative axial sliding therein, a retractable stud extending through the wall of said tube for engagement with the ribbed outer surface of the ferrule to permit the latter to be moved axially for rough focusing, and means for moving said stud axially of the assembly to accomplish fine focusing.

5. In a device of the class described, the combination with a lens having an externally substantially circumferentially ribbed ferrule, of a mounting having a supporting bore, a focusing tube axially slidable in said bore surrounding the ferrule and supporting the latter for relative axial sliding therein, said tube having aperture in its wall, a retractable stud closely fitting said aperture and extending through it for engagement with the ferrule to exert a detent action on its ribbed surface permitting the ferrule to be moved axially in the tube for rough focusing, and means for moving said stud and focusing tube axially of the assembly to move said tube and ferrule to accomplish fine focusing.

THOMAS J. MORGAN.
GEORGE P. HAZZARD.

REFERENCES CITED

The following references are of record in the file of this patent:

UNITED STATES PATENTS

| Number | Name | Date |
|---|---|---|
| 1,780,945 | Sapier | Nov. 11, 1930 |
| 1,848,253 | Howell | Mar. 8, 1932 |
| 1,855,775 | Shapiro | Apr. 26, 1932 |
| 1,954,876 | Joannides | Apr. 17, 1934 |
| 2,116,704 | Laube et al. | May 10, 1938 |
| 2,373,052 | Rausch | Apr. 3, 1945 |
| 2,407,511 | Peck | Sept. 10, 1946 |